(12) United States Patent
Shin et al.

(10) Patent No.: US 7,976,978 B2
(45) Date of Patent: Jul. 12, 2011

(54) MEMBER OF CONNECTING ELECTRODE IN BATTERY MODULE

(75) Inventors: Yongshik Shin, Daejeon (KR); Jeeho Kim, Daejeon (KR); Jin Woong Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/446,796

(22) PCT Filed: Sep. 29, 2007

(86) PCT No.: PCT/KR2007/004773
§ 371 (c)(1),
(2), (4) Date: Sep. 24, 2009

(87) PCT Pub. No.: WO2008/050952
PCT Pub. Date: May 2, 2008

(65) Prior Publication Data
US 2010/0009251 A1    Jan. 14, 2010

(30) Foreign Application Priority Data
Oct. 23, 2006 (KR) .................. 10-2006-0102639

(51) Int. Cl.
H01M 6/42 (2006.01)
H01M 2/24 (2006.01)
H01M 6/12 (2006.01)
H01M 6/46 (2006.01)

(52) U.S. Cl. .................. 429/149; 429/160; 429/162

(58) Field of Classification Search .............. 429/149, 429/156, 163, 100, 96, 209, 211, 159, 123, 429/122, 148, 151, 152, 208; 29/623.1–623.5, 29/249, 745; 439/754–774
See application file for complete search history.

(56) References Cited

U.S. PATENT DOCUMENTS

| | | | |
|---|---|---|---|
| 3,640,775 A | 2/1972 | Fitchman et al. | |
| 4,623,206 A * | 11/1986 | Fuller | 439/81 |
| 5,736,835 A * | 4/1998 | Nakajo et al. | 320/112 |
| 5,866,276 A * | 2/1999 | Ogami et al. | 429/120 |
| 6,555,264 B1 | 4/2003 | Hamada et al. | |
| 2003/0099880 A1* | 5/2003 | Park et al. | 429/211 |
| 2006/0162149 A1* | 7/2006 | Ha et al. | 29/623.1 |
| 2006/0170394 A1* | 8/2006 | Ha et al. | 320/107 |
| 2006/0194101 A1 | 8/2006 | Ha et al. | |
| 2007/0037051 A1* | 2/2007 | Kim et al. | 429/151 |

FOREIGN PATENT DOCUMENTS

| | | |
|---|---|---|
| DE | 19513774 A1 | 10/1995 |
| JP | 2002-298805 A | 10/2002 |
| KR | 10-2005-0077744 A | 8/2005 |
| KR | 10-2006-0064854 A | 6/2006 |
| KR | 10-2006-0073433 A | 6/2006 |
| WO | WO 01/73898 A1 | 10/2001 |

\* cited by examiner

*Primary Examiner* — Jennifer K. Michener
*Assistant Examiner* — Eli S Mekhlin
(74) *Attorney, Agent, or Firm* — Birch, Stewart, Kolasch & Birch, LLP

(57) ABSTRACT

Disclosed herein is an electrode terminal connecting member for electrically interconnecting plate-shaped secondary battery cells ('battery cells') constituting a battery module, wherein the electrode terminal connecting member includes a coupling part ('bent coupling part') bent to form a groove at the rear of the electrode terminal connecting member such that a plate-shaped electrode terminal ('battery cell electrode terminal') of each battery cell is inserted into the groove, an external input and output terminal protruding toward the front of the electrode terminal connecting member while being bent, and a voltage detection terminal protruding toward the front of the electrode terminal connecting member while being bent.

15 Claims, 18 Drawing Sheets

900

1100

MEMBER OF CONNECTING ELECTRODE IN BATTERY MODULE

FIELD OF THE INVENTION

The present invention relates to an electrode terminal connecting member, and, more particularly, to an electrode terminal connecting member for electrically interconnecting plate-shaped secondary battery cells ('battery cells') constituting a battery module, wherein the electrode terminal connecting member includes a coupling part ('bent coupling part') bent to form a groove at the rear of the electrode terminal connecting member such that a plate-shaped electrode terminal ('battery cell electrode terminal') of each battery cell is inserted into the groove, an external input and output terminal protruding toward the front of the electrode terminal connecting member while being bent, and a voltage detection terminal protruding toward the front of the electrode terminal connecting member while being bent.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

As a result, kinds of applications using the secondary battery are being increased owing to advantages of the secondary battery, and hereafter the secondary battery is expected to be applied to more applications and products than now.

Small-sized mobile devices use one or several battery cells for each device. On the other hand, middle- or large-sized devices, such as vehicles, use a middle- or large-sized battery module having a plurality of battery cells electrically connected with each other because high output and large capacity are necessary for the middle- or large-sized devices.

The size and weight of the battery module is directly related to the receiving space and output of the corresponding middle- or large-sized device. For this reason, manufacturers are trying to manufacture small-sized, light-weight battery modules. Furthermore, devices, which are subject to a large number of external impacts and vibrations, such as electric bicycles and electric vehicles, require stable electrical connection and physical coupling between components constituting the battery module. In addition, a plurality of battery cells are used to accomplish high output and large capacity, and therefore, the safety of the battery module is regarded as important.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, including a sheathing member made of an aluminum laminate sheet, because the weight of the pouch-shaped battery is small, and the manufacturing costs of the pouch-shaped battery are low.

In spite of the above-mentioned advantages, however, the pouch-shaped battery, used as a unit cell of the battery module, has several problems.

First, the pouch-shaped battery is constructed in a structure in which the plate-shaped electrode terminals protrude from the upper end of the battery case, with the result that the electrical connection between the electrode terminals necessary for constructing a battery module is difficult. The electrical connection between the electrode terminals is accomplished generally by coupling the electrode terminals to each other by welding using wires, plates, or bus bars; however, the coupling between the plate-shaped electrode terminals by welding is not easy. Generally, the plate-shaped electrode terminals are partially bent, and the plates or the bus bars are welded to the bent portions of the plate-shaped electrode terminals, which requires skilled technique and complicates a process for electrically connecting the electrode terminals to each other. Furthermore, the coupled region may be separated from each other due to external impact, which causes the defect of the pouch-shaped battery.

Secondly, the pouch-shaped battery has a low mechanical strength. For this reason, additional members for maintaining stable coupling and assembly are required when a plurality of batteries are stacked to manufacture a battery module. For example, additional mounting members, such as cartridges, in each of which one or more unit batteries mounted, are used when the pouch-shaped batteries are stacked to manufacture the battery module. The cartridges are stacked to manufacture the battery module.

Also, when a plurality of battery cells are used to construct a middle- or large-sized battery module or when a plurality of unit modules, each including a predetermined number of battery cells, are used to construct a middle- or large-sized battery module, a large number of members are needed generally to accomplish the mechanical coupling and electrical connection between the battery cells or between the unit modules. Furthermore, a space necessary to couple, weld, or solder the members for the mechanical coupling and electrical connection is required, with the result that the total size of the system is increased.

In addition, when the pouch-shaped battery is applied to a device, such as a vehicle, to which external forces, such as vibrations and impacts, are continuously applied, the output of the device may be unsafe and a short circuit may occur due to the increase of the contact resistance at the electrical connection region of the pouch-shaped battery.

Consequently, there is a high necessity for a technology on the electrical connection structure of cell modules in a middle- or large-sized battery module constructed such that the cell modules are combined to acquire high-output, large-capacity power, i.e., a technology on the connection structure between electrode terminal connecting members for electrically interconnecting a plurality of battery cells mounted in each cell module and insulation members, to which the respective electrode terminal connecting members are mounted.

SUMMARY OF THE INVENTION

Therefore, the present invention has been made to solve the above problems, and other technical problems that have yet to be resolved.

Specifically, it is an object of the present invention to provide an electrode terminal connecting member that is capable of easily accomplishing the electrical connection and mechanical coupling between a plurality of cell modules of a middle- or large-sized battery module, thereby improving the productivity and safety of the middle- or large-sized battery module.

In accordance with one aspect of the present invention, the above and other objects can be accomplished by the provision of an electrode terminal connecting member for electrically interconnecting plate-shaped secondary battery cells ('battery cells') constituting a battery module, wherein the electrode terminal connecting member includes a coupling part ('bent coupling part') bent to form a groove at the rear of the electrode terminal connecting member such that a plate-shaped electrode terminal ('battery cell electrode terminal') of each battery cell is inserted into the groove, an external input and output terminal protruding toward the front of the electrode terminal connecting member while being bent, and a voltage detection terminal protruding toward the front of the electrode terminal connecting member while being bent.

The electrode terminal connecting member according to the present invention is constructed in a single component structure that is capable of easily accomplishing the electrical connection and mechanical coupling between the electrode terminals of the battery cells. Consequently, the assembly process is very simply carried out by the electrode terminal connecting member according to the present invention as compared to other connection means, such as bolts and nuts, and other connecting methods, such as welding, and the electrode terminal connecting member according to the present invention provides an excellent coupling force. Furthermore, the voltage detection is simultaneously carried out during the electrical connection between the electrode terminals, and therefore, additional connecting members for the voltage detection are not needed.

Preferably, the number of the bent coupling parts and the external input and output terminals corresponds to that of the battery cells such that at least two battery cells are electrically connected to each other. For example, when electrode terminals of two battery cells are connected to each other so as to manufacture a battery module, two bent coupling parts and two external input and output terminals are needed.

The shape of the electrode terminal connecting member according to the present invention may be decided depending upon the positions of the battery cells to be connected. For example, when two battery cells are stacked vertically, i.e., the battery cells are not located at the same height, the bent coupling parts may be formed such that the bent coupling parts have different heights.

When two or more battery cells are sequentially stacked, two bent coupling parts are preferably formed such that the height difference between the bent coupling parts is equivalent to the thickness of each battery cell, and therefore, it is possible to connect the electrode terminals of the battery cells in series and/or parallel with each other in a compact fashion without using an additional member. For example, when the external input and output terminals are located at opposite ends of the electrode terminal connecting member, and the voltage detection terminal is located approximately at the middle of the electrode terminal connecting member, it is easy to construct a circuit for detecting the voltage at the corresponding region of each cell module while connecting the electrode terminals of the stacked battery cells in series or parallel with each other.

The protruding heights of the external input and output terminal and the voltage detection terminal are not particularly restricted. Preferably, the external input and output terminal and the voltage detection terminal are bent in parallel to the front of the electrode terminal connecting member, and therefore, when a plurality of battery cells are electrically connected to each other, while the battery cells are stacked, the electrical connection between all the battery cells is simultaneously accomplished by a process for attaching a printed circuit board, to the fronts of the battery cells, at which the connecting members are located.

In a preferred embodiment, the external input and output terminal is provided with a coupling hole, through which the connection of an external circuit to the external input and output terminal is more easily performed. For example, when the external circuit is a wire or cable, the end of the wire or cable is inserted through the coupling hole, and then soldering or welding is performed to the inserted portion of the wire or cable. Alternatively, a bolt may be inserted through the coupling hole such that the bolt is mechanically coupled to the end of the wire or cable.

The material for the electrode terminal connecting member according to the present invention is not particularly restricted so long as the electrode terminal connecting member is made of a conductive material. For example, a nickel plate having a predetermined thickness may be bent into a predetermined form to manufacture the electrode terminal connecting member.

In accordance with another aspect of the present invention, there is provided a middle- or large-sized battery module constructed in a structure in which the electrode terminal connecting members are coupled to corresponding electrode terminals of battery cells.

The middle- or large-sized battery module is constructed in a structure in which a plurality of battery cells are stacked with high integration. In the stacking type structure, the battery cells may face each other while the battery cells are in contact with each other or while the battery cells are spaced a predetermined distance from each other. In the latter case, for example, the battery cells may be coupled to each other via adhesive members, such as double-sided adhesive tapes, attached at predetermined regions of the battery cells, to stabilize the stacking type structure. Alternatively, one or more battery cells may be mounted in a cartridge, and a plurality of cartridges are connected to each other in a stacking fashion. When a plurality of cell modules, each having a battery cell mounted in a cartridge, are stacked, a battery module, constituted by the cell modules, exhibits high integration and structural stability.

Preferably, the cartridge of each cell module includes a cartridge body constructed in a rectangular structure corresponding to each battery cell such that the battery cell is mounted to the cartridge body, the cartridge body being open at the top thereof, and a top cover mounted to the open top of the battery cell while the battery cell is mounted to the cartridge body. The cartridge body is provided at the bottom thereof with a plurality of through-holes, the cartridge body is provided at one side of the upper end of each side wall thereof with a coupling protrusion, by which the cartridge body is coupled to another cartridge body, while the cartridge body is provided at one side of the lower end of each side wall thereof with a coupling groove corresponding to the coupling protrusion, and the cartridge body is provided at the front thereof with a coupling part, to which an additional member for mounting the electrode terminal connecting member ('mounting insulation member') is coupled in an assembly fashion, such that the electrode terminal connecting member is stably connected to the corresponding electrode terminal of the corresponding battery cell.

The plate-shaped battery cell is a secondary battery having a relatively small thickness, a relatively large width, and a relatively large length, and therefore, it is possible to minimize the overall size of a battery module when a plurality of battery cells are stacked to construct the battery module. In a preferred embodiment, the plate-shaped battery cell is a secondary battery constructed in a structure in which an electrode assembly is mounted in a battery case made of a laminate sheet including a resin layer and a metal layer, and a pair of electrode terminals protrude from one side of the battery case. Specifically, the plate-shaped battery cell may be constructed in a structure in which the electrode assembly is mounted in a pouch-shaped battery case made of an aluminum laminate sheet. The secondary battery constructed in the above-described structure may be referred to as a pouch-shaped battery cell.

Cathodes, anodes, separators, and an electrolyte, constituting the pouch-shaped battery cell, are well known in the art to which the present invention pertains. For example, a lithium transition metal oxide, such as lithium cobalt oxide, lithium manganese oxide, or lithium nickel oxide, or composite oxide may be used as an active material for the cathodes.

During the charge and discharge of the pouch-shaped battery cell, heat is generated from the pouch-shaped battery cell. Consequently, the cartridge body is preferably provided at the bottom thereof with a plurality of through-holes, which are arranged in a predetermined pattern, to effectively discharge the heat from the battery cell, thereby preventing the overheating of the battery cell.

Also, the through-holes may be divided into several through-hole groups, which are spaced a predetermined distance from each other. At least one double-sided adhesive tape may be attached to the remaining region of the cartridge body, excluding the region of the cartridge body where the through-hole groups are located, for fixing the cartridge body and the corresponding battery cell. When external impacts are applied to the cartridge, the movement of the battery cell in the cartridge is restrained by the double-sided adhesive tape, whereby an internal short circuit of the battery cell is prevented.

The coupling between the cartridge bodies may be carried out in various manners. Preferably, each cartridge body is provided at the upper end of the rear wall thereof with a coupling concavo-convex part, by which the cartridge body is coupled to another cartridge body, and the cartridge body is provided at the lower end of the rear wall thereof with a coupling groove corresponding to the coupling concavo-convex part, whereby the cartridge bodies are coupled to each other without using additional members. Alternatively, the coupling concavo-convex part may be formed at the lower end of the rear wall of each cartridge body, and the coupling groove may be formed at the upper end of the rear wall of each cartridge body.

Generally, the middle- or large-sized battery module is manufactured by a method of stacking a plurality of battery cells with high integration. In this case, the neighboring battery cells are preferably spaced a predetermined distance from each other so as to effectively remove heat generated during the charge and discharge of the battery cells. Specifically, one or more battery cells, having a low mechanical strength, are mounted in a cartridge, and a plurality of cartridges are stacked to construct a battery module. Consequently, it is necessary to form a coolant channel between the stacked cartridges such that heat accumulating between the stacked battery cells is effectively removed.

In a preferred embodiment, the formation of the coolant channel is possible through a structure in which the cartridge body is provided at the upper end of the each side wall thereof with at least one protrusion. Consequently, the coolant channel is formed when another cartridge body is stacked on the cartridge body. The cartridge bodies are spaced apart a predetermined distance from each other by the protrusions to form the coolant channel, along which a coolant flows.

The materials for the cartridge body and the top cover are not particularly restricted so long as the cartridge body and the top cover are made of a material exhibiting electrical insulation and having a predetermined mechanical strength. For example, the cartridge body and the top cover may be made of metal coated with an insulative material, insulative polymer, or a resin composite thereof, but the material for the cartridge body and the top cover is not limited to the above-specified ones.

Preferably, the mounting insulation member is constructed approximately in a rectangular parallelepiped structure having a size approximately corresponding to the front of the cartridge body, the mounting insulation member is provided at the rear thereof with a groove ('cartridge coupling groove'), in which the front end of each cartridge body is inserted, the mounting insulation member is provided at the front thereof with holes ('electrode terminal through-holes'), through which electrode terminals of each battery cell, introduced through the coupling groove, are exposed, and the mounting insulation member is provided at the top thereof, above the electrode terminal through-holes, with a coupling upper end, which is inserted into the electrode terminal connecting member.

The mounting insulation member serves to electrically insulate the electrode terminals of the neighboring battery cells from each other. For this reason, the mounting insulation member is made of an electrically insulative material. A preferred example of the electrically insulative material may be various plastic resins. However, the material for the mounting insulation member is not particularly restricted so long as the mounting insulation member accomplishes the electric insulation.

The mounting insulation member may be coupled to the electrode terminals of the battery cell and the cartridge in various manners. In a preferred embodiment, the battery cell is mounted on the cartridge body, the electrode terminals of the battery cell are bent downward such that the electrode terminals are brought into tight contact with the coupling part formed at the front end of the cartridge body, and the front end of the cartridge body is inserted into the cartridge coupling groove formed at the rear of the mounting insulation member, whereby the coupling between mounting insulation member and the electrode terminals of the battery cell and the cartridge is accomplished. Furthermore, the electrode terminals inserted into the mounting insulation member (the electrode terminals surrounding the front end of the cartridge body) are more securely coupled to the mounting insulation member, when the electrode terminal connecting member is coupled to the mounting insulation member.

Preferably, the mounting insulation member is constructed in a structure in which the electrode terminal connecting member for the electrical connection between the battery cells is easily mounted to the mounting insulation member. For example, the mounting insulation member may be further provided at the front thereof with a location part, in which the external input and output terminal and the voltage detection terminal of the electrode terminal connecting member are stably located. Also, the mounting insulation member may be provided at the location part thereof, in which the external input and output terminal of the electrode terminal connecting member is stably located, with a coupling depression, and the electrode terminals of the battery cell, exposed outward through the electrode terminal through-holes, may be inserted into the rear groove of the bent coupling part of the electrode terminal connecting member.

Consequently, the coupling upper end of the mounting insulation member and the electrode terminals inserted through the mounting insulation member are tightly coupled to the bent coupling part of the electrode terminal connecting member, whereby the coupling of the electrode terminal connecting member to the mounting insulation member is stably accomplished, The middle- or large-sized battery module, using the above-described cartridges, may be manufactured, for example, by mounting a battery cell on a cartridge body, stacking a plurality of cartridge bodies, and coupling a top cover to the uppermost cartridge body.

In accordance with a further aspect of the present invention, there is provided a high-output, large-capacity battery module assembly including a plurality of middle- or large-sized battery modules. The number of the middle- or large-sized battery modules may be changed depending upon a desired capacity and output.

The middle- or large-sized battery module and the battery module assembly according to the present invention are preferably used as a power source for electric vehicles and hybrid electric vehicles, which have a limited installation space and are exposed to frequent vibrations and strong impacts, in consideration of the installation efficiency and the structural stability.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
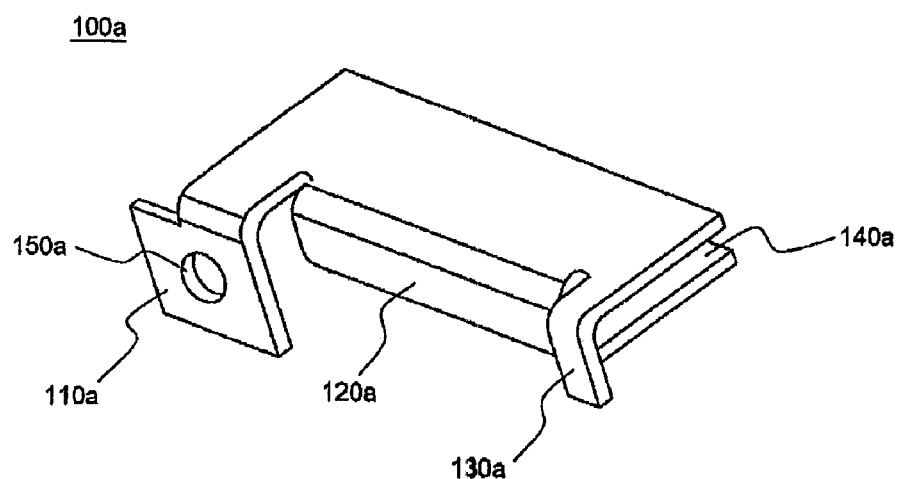
FIGS. 1 to 3 are typical views illustrating various electrode terminal connecting members according to preferred embodiments of the present invention.
Figure 2:
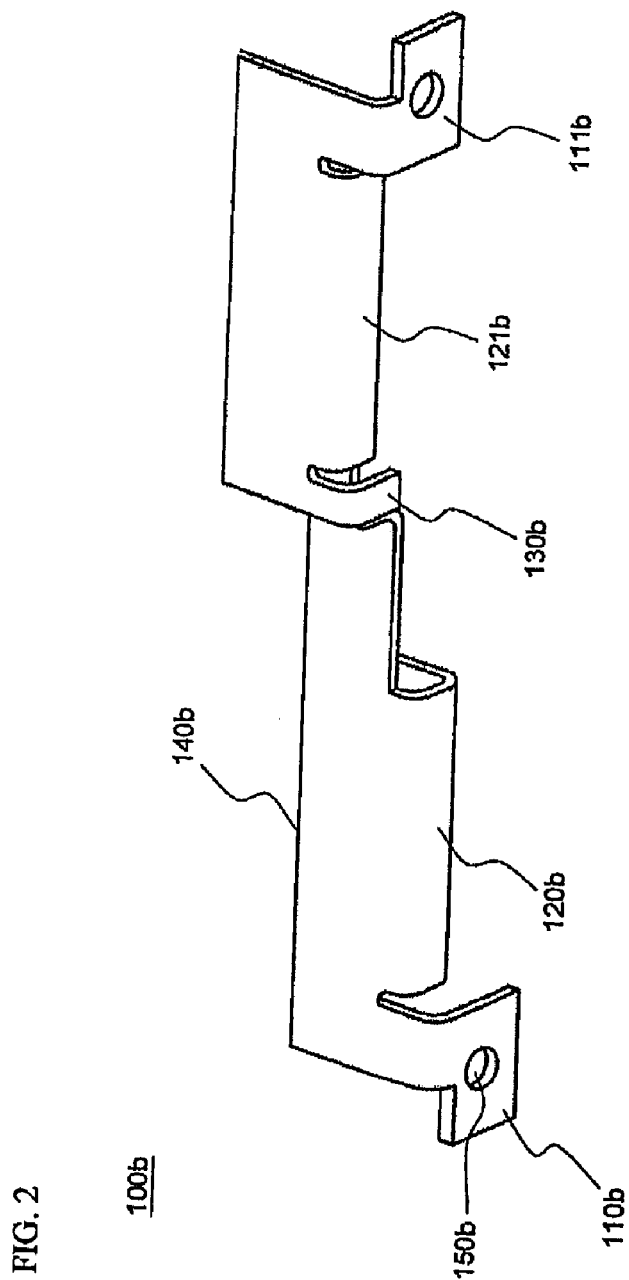
Figure 3:
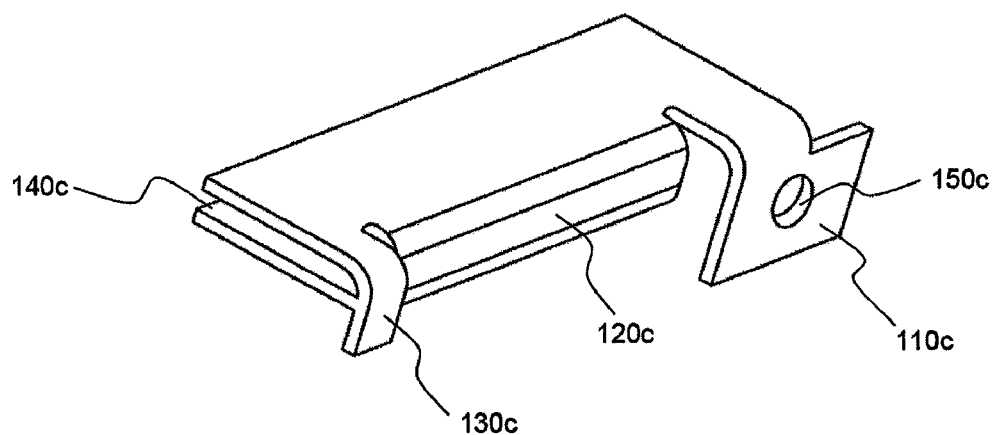
Figure 4:
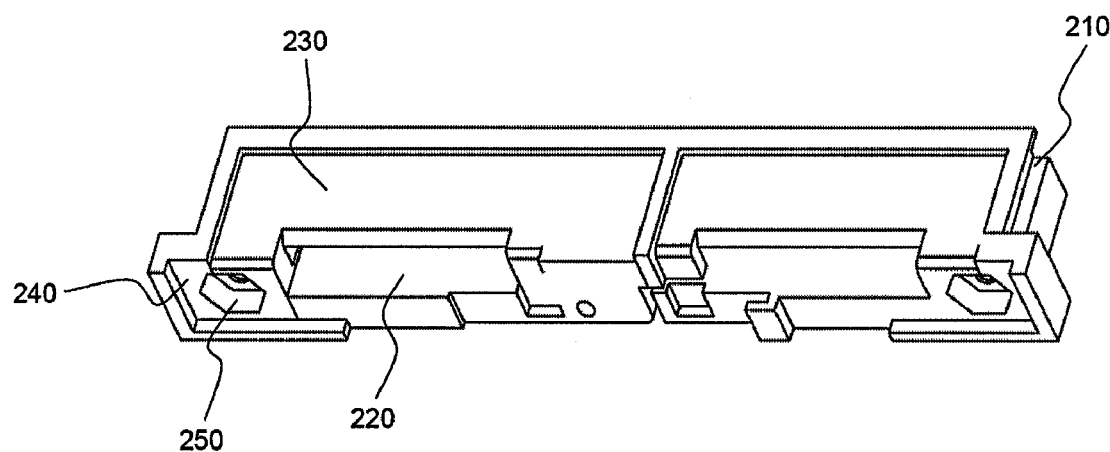
FIG. 4 is a typical view illustrating a mounting insulation member, to which the electrode terminal connecting members of FIGS. 1 to 3 are mounted during the construction of a battery module.

FIGS. 1 to 3 are typical views illustrating various electrode terminal connecting members according to preferred embodiments of the present invention, and FIG. 4 is a typical view illustrating a mounting insulation member, to which the electrode terminal connecting members are mounted during the construction of a battery module.

For easy understanding, the electrode terminal connecting member 100a shown in FIG. 1 is referred to as an "A-type connecting member," the electrode terminal connecting member 100b shown in FIG. 2 is referred to as a "B-type connecting member," and the electrode terminal connecting member 100c shown in FIG. 3 is referred to as an "C-type connecting member."

Referring to these drawings, the electrode terminal connecting member 100a includes a bent coupling part 120a, which is bent to form a groove 140a at the rear of the electrode terminal connecting member 100a such that an electrode terminal (for example, a cathode terminal) of a battery cell (not shown) is inserted into the groove 140a, an external input and output terminal 110a protruding toward the front of the electrode terminal connecting member 100a while being bent, and a voltage detection terminal 130a protruding toward the front of the electrode terminal connecting member 100a while being bent. The electrode terminal connecting member 100b includes a bent coupling part 120b, which is bent to form a groove 140b at the rear of the electrode terminal connecting member 100b such that an electrode terminal (for example, a cathode terminal) of a battery cell (not shown) is inserted into the groove 140b, an external input and output terminal 110b protruding toward the front of the electrode terminal connecting member 100b while being bent, and a voltage detection terminal 130b protruding toward the front of the electrode terminal connecting member 140b while being bent. The electrode terminal connecting member 140c includes a bent coupling part 120c, which is bent to form a groove 140c at the rear of the electrode terminal connecting member 100c such that an electrode terminal (for example, a cathode terminal) of a battery cell (not shown) is inserted into the groove 140c, an external input and output terminal 140c protruding toward the front of the electrode terminal connecting member 100c while being bent, and a voltage detection terminal 130c protruding toward the front of the electrode terminal connecting member 100c while being bent.

The external input and output terminal 110a and the voltage detection terminal 130a are bent in parallel to the front of the electrode terminal connecting member 100a. The external input and output terminal 110b and the voltage detection terminal 130b are bent in parallel to the front of the electrode terminal connecting member 100b. The external input and output terminal 110c and the voltage detection terminal 130c are bent in parallel to the front of the electrode terminal connecting member 100c.

The bent coupling parts 120a, 120b, and 120c and the external input and output terminals 110a, 110b, and 110c are formed in correspondence to the number of battery cells to be electrically connected. For example, the electrode terminal connecting member 100b shown in FIG. 2 includes two bent coupling parts 120b and 121b and two external input and output terminals 110b and 111b, by which electrode terminals of two battery cells are connected in parallel or in series to each other. Also, the bent coupling parts 120b and 121b are formed such that the height difference between the bent coupling parts 120b and 121b is equivalent approximately to the thickness of the battery cell. The external input and output terminals 110b and 111b are located at opposite ends of the electrode terminal connecting member 100b. The voltage detection terminal 130b is located approximately at the middle of the electrode terminal connecting member 100b.

The external input and output terminals 110a, 110b, and 110c are provided with coupling holes 150a, 150b, and 150c, respectively, through which secure electrical connection using wires is easily accomplished.

Referring to FIG. 4, the mounting insulation member 200 is constructed approximately in a rectangular parallelepiped structure. At the rear of the mounting insulation member 200 is formed a cartridge coupling groove 210, in which the front end of a cartridge body (not shown) is inserted. At the front of the mounting insulation member 200 are formed a pair of electrode terminal through-holes 220, through which electrode terminals of a battery cell, introduced through the coupling groove 210, are exposed.

At the top of the mounting insulation member 200, above the electrode terminal through-holes 220, is formed a coupling upper end 230, which is inserted into the rear groove 140a, 140b, 140c of the bent coupling part 120a, 120b, 120c of the electrode terminal connecting member 100a, 100b, 100c (see FIGS. 1 to 3).

At the front of the mounting insulation member 200 is also formed a location part 240, in which the external input and output terminal 110a, 110b, 110c and the voltage detection terminal 130a, 130b, 130c of the electrode terminal connecting member 100a, 100b, 100c (see FIGS. 1 to 3) are stably located. Also, a coupling depression 250 is formed at a position corresponding to the coupling hole 150a, 150b, 150c of the external input and output terminal 110a, 110b, 110c while the electrode terminal connecting member 100a, 100b, 100c is mounted to the mounting insulation member 200.

Figure 5:
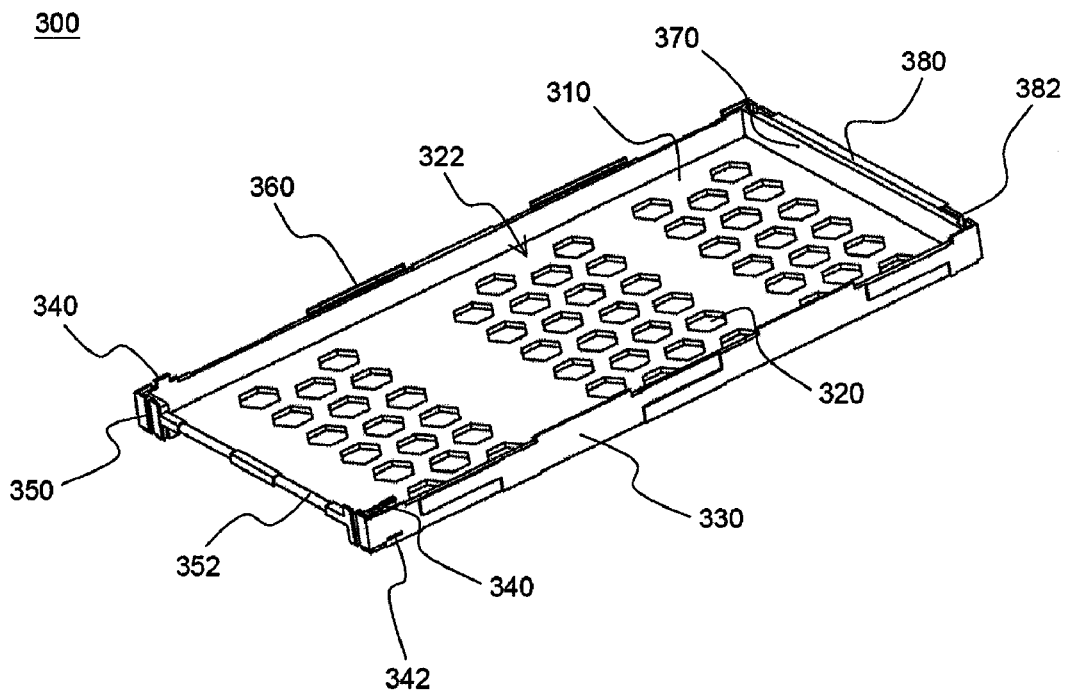
FIGS. 5 and 6 are perspective views illustrating a cartridge body and a top cover constituting a cell module, in which the electrode terminal connecting members of FIGS. 1 to 3 and the mounting insulation member of FIG. 4 are used, respectively.
Figure 6:
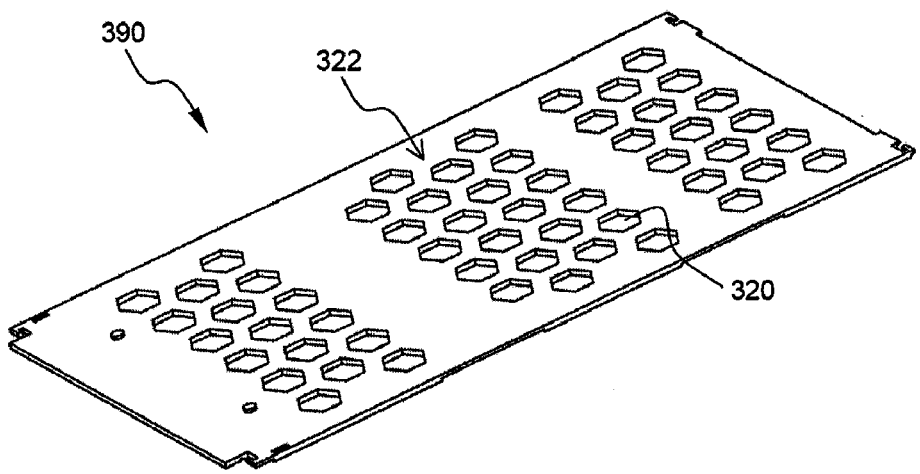
Figure 7:
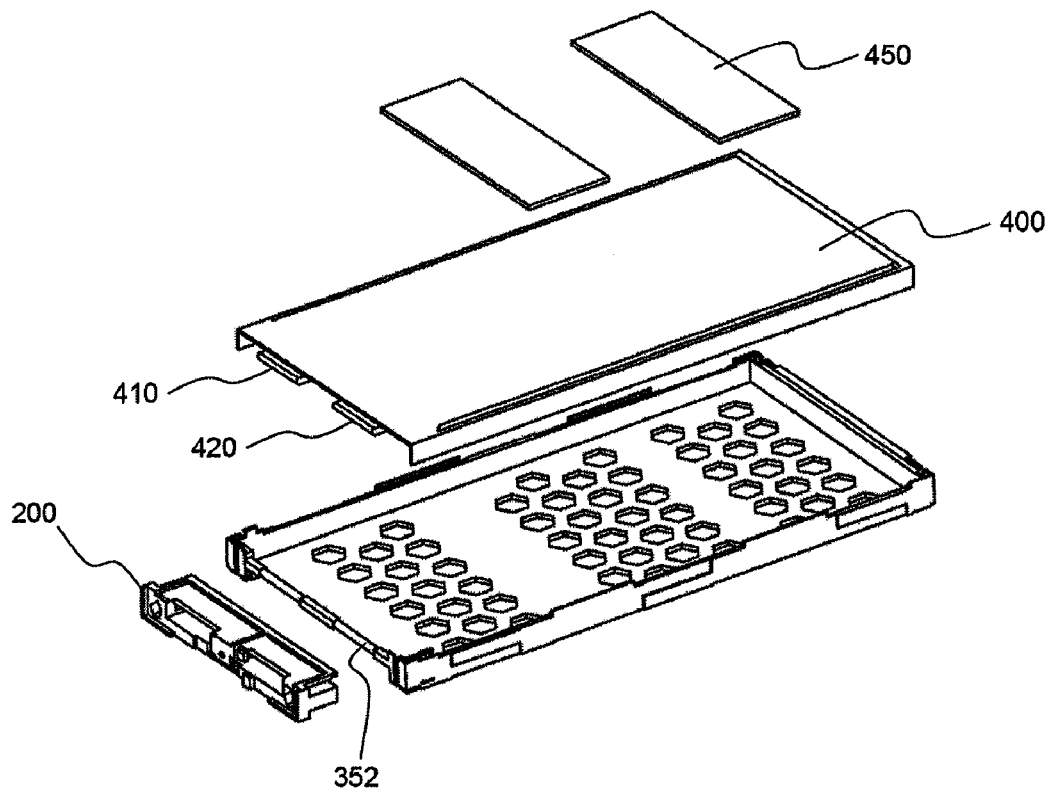
FIGS. 7 and 8 are typical views illustrating a process for mounting a battery cell to the cartridge body of FIG. 5.
Figure 8:
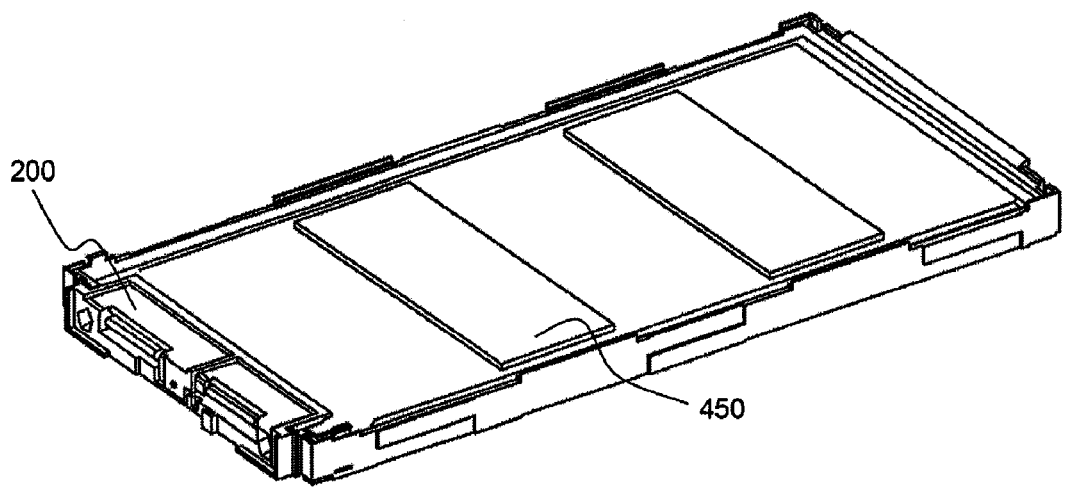

FIGS. 5 and 6 are perspective views illustrating a cartridge body and a top cover constituting a cell module, in which the electrode terminal connecting members of FIGS. 1 to 3 and the mounting insulation member of FIG. 4 are used, respectively, and FIGS. 7 and 8 are typical views illustrating a process for mounting a battery cell to the cartridge body of FIG. 5.

Referring to these drawings, the cartridge body 300 is constructed in a rectangular structure corresponding to a plate-shaped battery cell 400 (hereinafter, will be shortly referred to as a "battery cell") such that the battery cell 400 is mounted to the cartridge body 300. The cartridge body 300 is open at the top thereof. Also, the cartridge body 300 is provided at the bottom 310 thereof with a plurality of through-holes 320, arranged in a predetermined pattern, for effectively discharging heat and thus preventing the overheating of the battery cell 400. The through-holes 320 are divided into several through-hole groups 322, which are spaced apart from each other by a distance corresponding to each adhesive tape 450, which will be attached to the bottom 310 of the cartridge body 300. The top cover 390 is also provided with a plurality of through-holes 320, which are arranged in a predetermined pattern to divide the through-holes 320 into several through-hole groups 322.

The cartridge body 300 is provided at one side of the upper end of each side wall 330 thereof with a coupling protrusion 340, by which the cartridge body 300 is another cartridge body (not shown). The cartridge body 300 is provided at one side of the lower end of each side wall 330 thereof with a coupling groove 342 corresponding to the coupling protrusion 340. Also, the cartridge body 300 is provided at the front 350 thereof with a coupling part 352, to which the mounting insulation member 200 is coupled in an assembly fashion.

The cartridge body 300 is provided at the upper ends of the opposite side walls 330 thereof with pluralities of protrusions 360, which form a coolant channel when another cartridge body (not shown) is stacked on the cartridge body 300. The cartridge bodies are spaced apart a predetermined distance from each other by the protrusions 360 to form the coolant channel, along which a coolant flows.

Also, the cartridge body 300 is provided at the upper end of a rear wall 370 thereof with a coupling groove 380, by which the cartridge body 300 is coupled to another cartridge body. The cartridge body 300 is provided at the lower end of the rear wall 370 thereof with a coupling concavo-convex part 382 corresponding to the coupling groove 380.

The adhesive tapes 450 may be different depending upon whether the adhesive tapes 450 are attached to the top or bottom of the battery cell 400. For example, when each adhesive tape 450 is attached to the top of the battery cell 400, the adhesive tape 450 may be an elastic single-sided adhesive tape having a predetermined thickness and exhibiting an adhesive property only at one side of each adhesive tape 450. On the other hand, when each adhesive tape 450 is attached to the bottom of the battery cell 400, the adhesive tape 450 may be a double-sided adhesive tape exhibiting an adhesive property only at both sides of each adhesive tape 450. When one cartridge is stacked on another cartridge, the space defined between the stacked cartridges is filled with the single-sided adhesive tapes, and, at the same time, the single-sided adhesive tapes are elastically pressurized to battery cells such that the battery cells are stably mounted in the respective cartridges. The single-sided adhesive tape may be an adhesive tape, such as a sponge, having a predetermined thickness and exhibiting elasticity. Alternatively, the single-sided adhesive tape may not be attached to the top of the battery cell, but may be brought into contact with the top of the battery cell when another cartridge body is applied to the top of the battery cell.

Hereinafter, a process for assembling the cell module will be described with reference to FIGS. 1 to 8. First, the adhesive tapes 450 are attached to the remaining region of the cartridge body 300, excluding the region of the cartridge body 300 where the through-hole groups 322 are formed, and the battery cell 400 is mounted to the cartridge body 300. Subsequently, electrode terminals 410 and 420 of the battery cell 400 are bent downward, and are brought into tight contact with the coupling part 352 formed at the front of the cartridge body 300 such that the bent electrode terminals 410 and 420 of the battery cell 400 surround the coupling part 352. Subsequently, the mounting insulation member 200 is assembled to the coupling part 352, with which the electrode terminals 410 and 420 of the battery cell 400 are in tight contact. Finally, the electrode terminal connecting members 100a, 100b, and 100c are coupled to the mounting insulation member 200, the adhesive tapes 450 are attached to the top of the battery cell 400, and the top cover 390 is mounted to the top of the battery cell 400. In this way, the cell module is manufactured.

However, the cell module assembly process may be changed according to circumstances.

The structure in which the electrode terminals of the battery cell are mounted to the cartridge body and the coupling structure between the electrode terminal connecting member and the mounting insulation member are more clearly shown in FIGS. 9 to 16.

Figure 9:
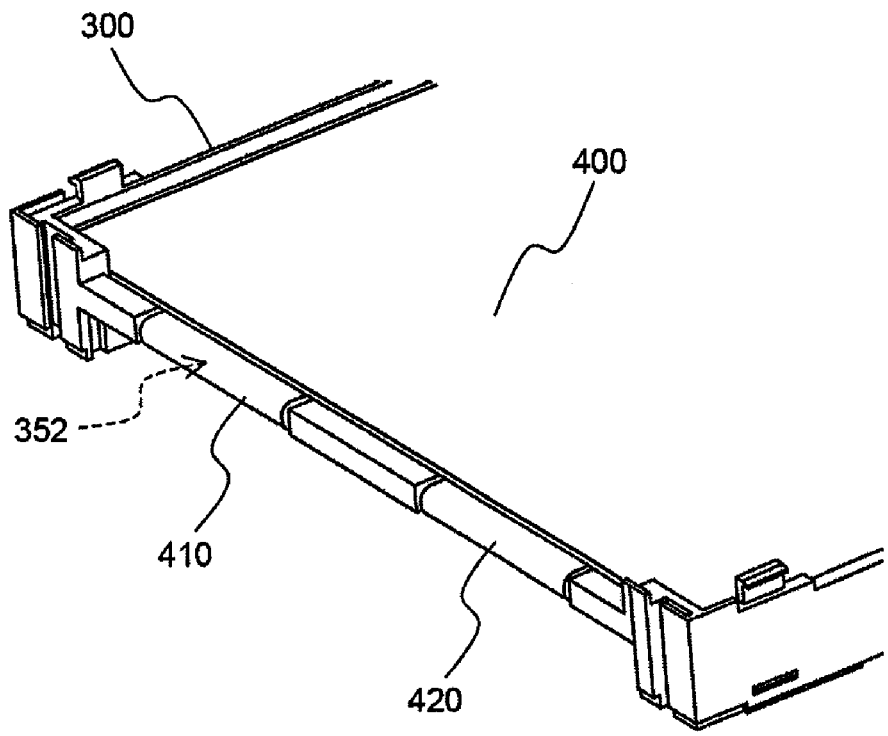
FIGS. 9 to 15 are typical views illustrating the structure in which electrode terminals of the battery cell are mounted to the cartridge body according to the present invention and the structure in which the electrode terminal connecting member is coupled to the mounting insulation members according to the present invention.
Figure 10:
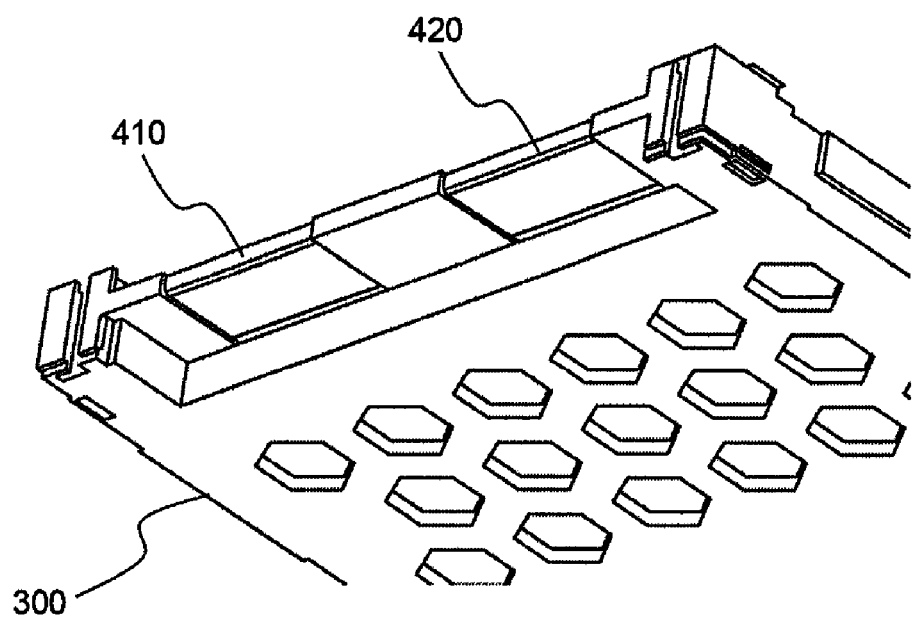

Referring first to FIGS. 9 and 10, the battery cell 400 is mounted to the cartridge body 300. Subsequently, the electrode terminals 410 and 420 of the battery cell 400 are bent, and are brought into tight contact with the coupling part 352 formed at the front of the cartridge body 300 such that the bent electrode terminals 410 and 420 of the battery cell 400 surround the coupling part 352. Consequently, the electrode terminals 410 and 420 of the battery cell 400, which may be mechanically weak, are supported by the coupling part 352 of the cartridge body 300, whereby the structural stability for coupling is greatly improved.

Figure 11:
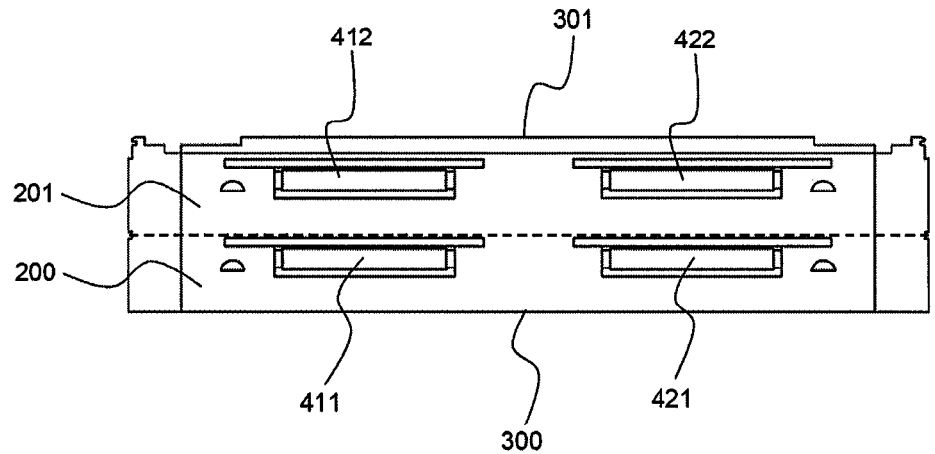

Two cartridge bodies, to each of which a mounting insulation member is coupled as described above, are stacked while battery cells are mounted in the respective cartridge bodies. As a result, the front structure of the stacked cartridge bodies is constructed as shown in FIG. 11. Specifically, a cathode terminal 411 and an anode terminal 421 of the lower cartridge body 300 and a cathode terminal 412 and an anode terminal 421 of the upper cartridge body 301 are electrically separated from each other while being exposed outward through the respective mounting insulation members 200 and 201.

Figure 12:
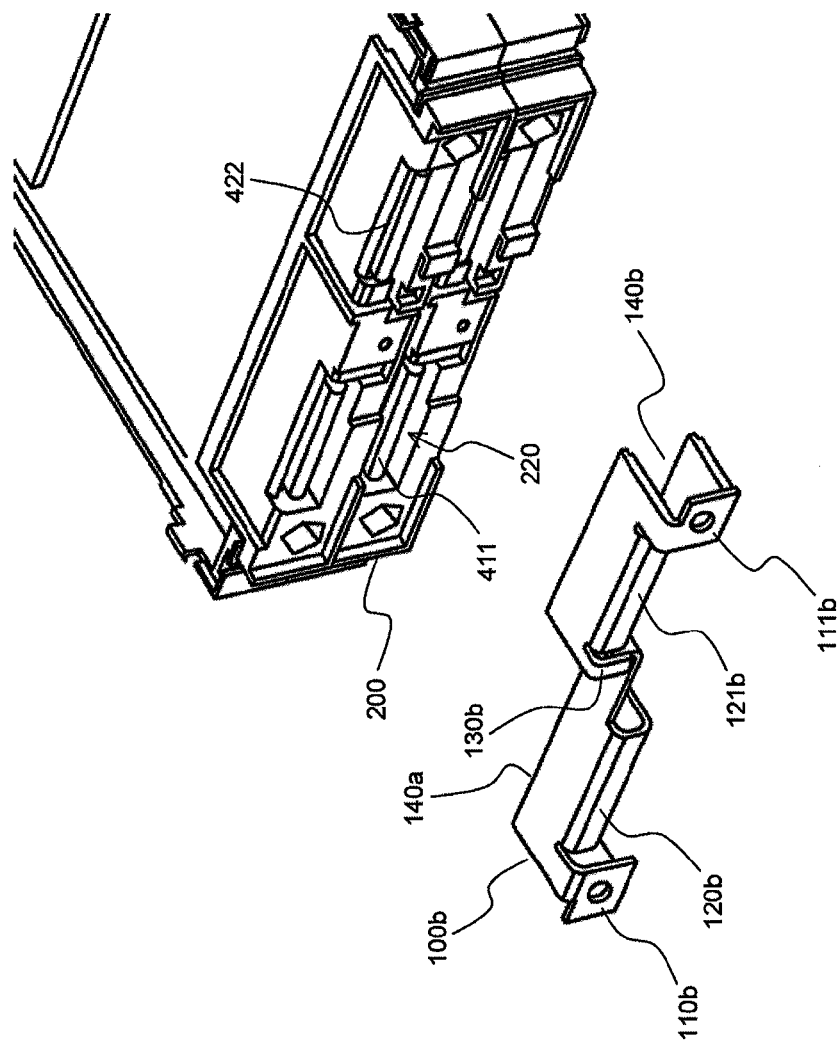

The B-type connecting member is coupled to the mounting insulation members, as shown in FIG. 12, such that these electrode terminals are connected in series with each other.

Referring to FIG. 12, the bent coupling parts 120b and 121b of the B-type connecting member 100b are formed such that the height difference between the bent coupling parts 120b and 121b is equivalent approximately to the thickness of each battery cell, the external input and output terminals 110b and 111b are located at opposite ends of the electrode terminal connecting member 100b, and the voltage detection terminal 130b is located approximately at the middle of the electrode terminal connecting member 100b, as previously described.

The coupling upper end 230 of the mounting insulation member 200 is inserted into the rear grooves 140b and 141b of the respective bent coupling parts 120b and 121b of the electrode terminal connecting member 100b, with the result that the electrode terminal connecting member 100b is coupled to the mounting insulation members. During the coupling between the electrode terminal connecting member 100b and the mounting insulation members, the electrode terminal connecting member 100b is connected to the electrode terminals 411 and 422 of the battery cells, which are exposed through the through-holes 220 of the mounting insulation member 200.

Figure 13:
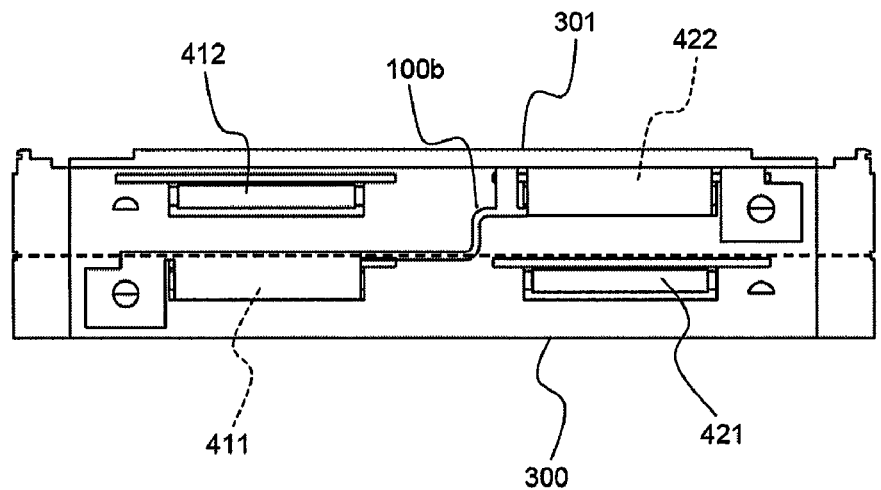
Figure 14:
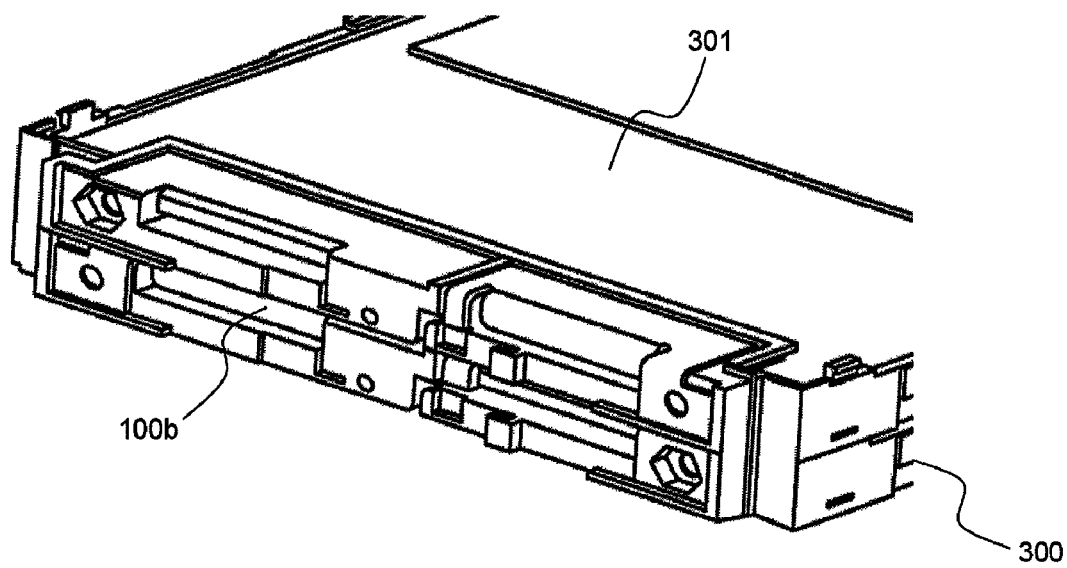
Figure 15:
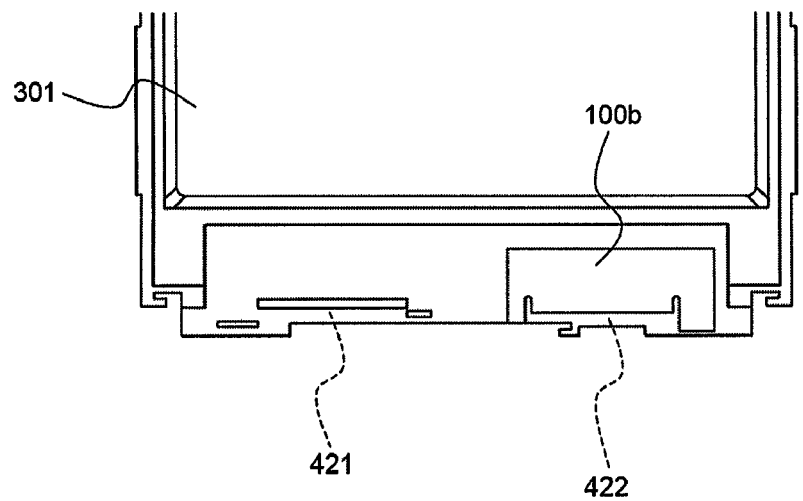

The coupling of the electrode terminal connecting member 100b to the mounting insulation members 200 is shown in FIGS. 13 to 15. The coupling between the electrode terminal connecting member 100b and the mounting insulation members 200 is shown in more detail in FIG. 16, which is a sectional view illustrating the coupling of the electrode terminal connecting member to the mounting insulation members, and FIG. 17. For easy understanding, the electrode terminal connecting member and the mounting insulation members, which are coupled to each other, excluding the cartridge body and the battery cell is illustrated in FIG. 17 as a rear perspective view.

Figure 16:
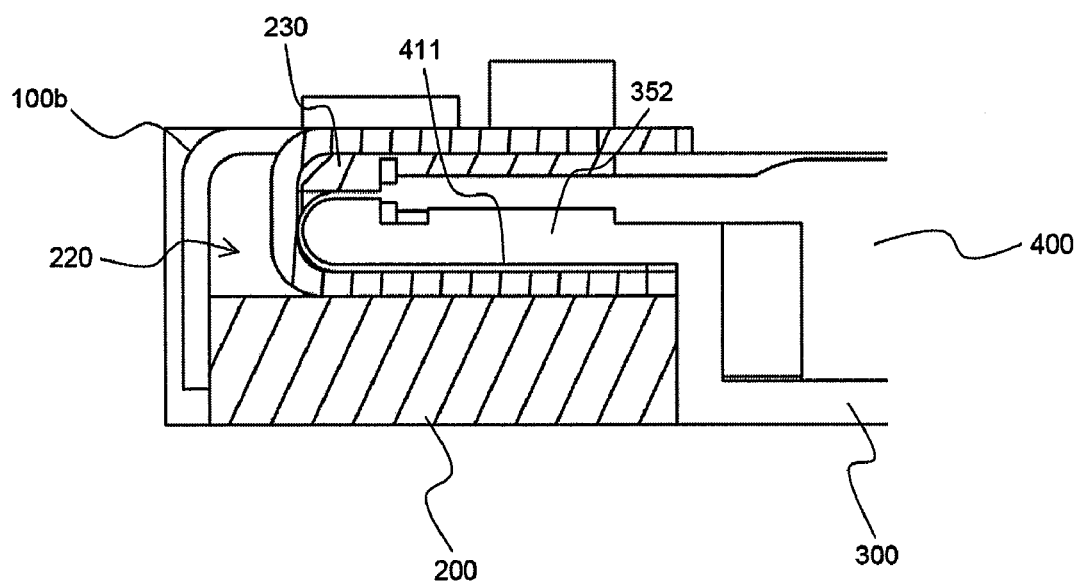
FIG. 16 is a sectional view illustrating the coupling of the electrode terminal connecting member to the mounting insulation members according to the present invention.
Figure 17:
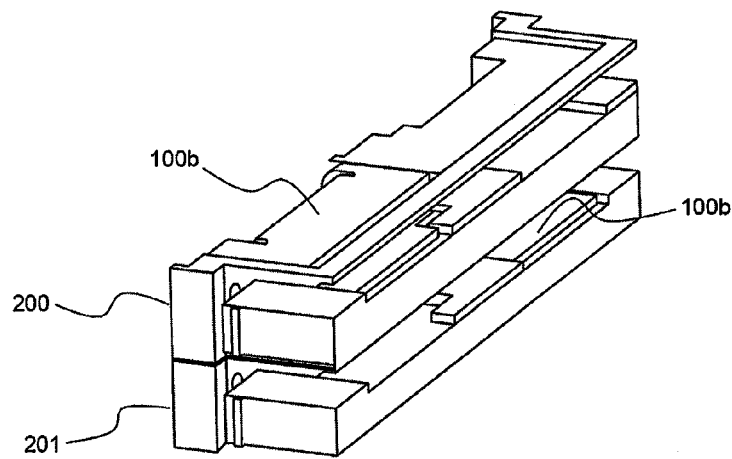
FIG. 17 is a rear perspective view illustrating the electrode terminal connecting member and the mounting insulation members, which are coupled to each other, excluding the cartridge body and the battery cell.

Referring to FIGS. 16 and 17, the electrode terminal 411 of the battery cell 400 are bent to surround the coupling part 352 formed at the front of the cartridge body 300. The bent electrode terminal 411 of the battery cell 400 is exposed through the corresponding through-hole 220 of the mounting insulation member 200. More specifically, the bent electrode terminal 411 of the battery cell 400 is in tight contact with the lower surface of the coupling upper end 230 of the mounting insulation member 200.

Consequently, when the electrode terminal connecting member 100b is coupled to the mounting insulation member 200, the coupling upper end 230 of the mounting insulation member 200 and the coupling part 352 of the cartridge body 300 are inserted into the rear groove of the electrode terminal connecting member 100b, with the result that the electrode terminal 411, which is in tight contact with the coupling upper end 230 of the mounting insulation member 200, is brought into contact with the electrode terminal connecting member 100b.

According to circumstances, the electrode terminal connecting member 100b may be coupled to the mounting insulation member 200, while the electrode terminal 411 of the battery cell 400 is bent upward to surround the coupling upper end 230 of the mounting insulation member 200 and is in tight contact with the coupling upper end 230 of the mounting insulation member 200.

Referring to FIGS. 13 to 15, the electrode terminal connecting member 100b electrically connects the cathode terminal 411 of the battery cell mounted in the first cartridge body 300 and the anode terminal 422 of the battery cell mounted in the second cartridge body 301 to each other. In the same manner, the anode terminal 412 of the battery cell mounted in the first cartridge body 300 may be connected to a cathode terminal of another cartridge body (not shown) stacked below the first cartridge body 300, and the cathode terminal 421 of the battery cell mounted in the second cartridge body 301 may be connected to an anode terminal of another cartridge body (not shown) stacked above the second cartridge body 301.

Figure 18:
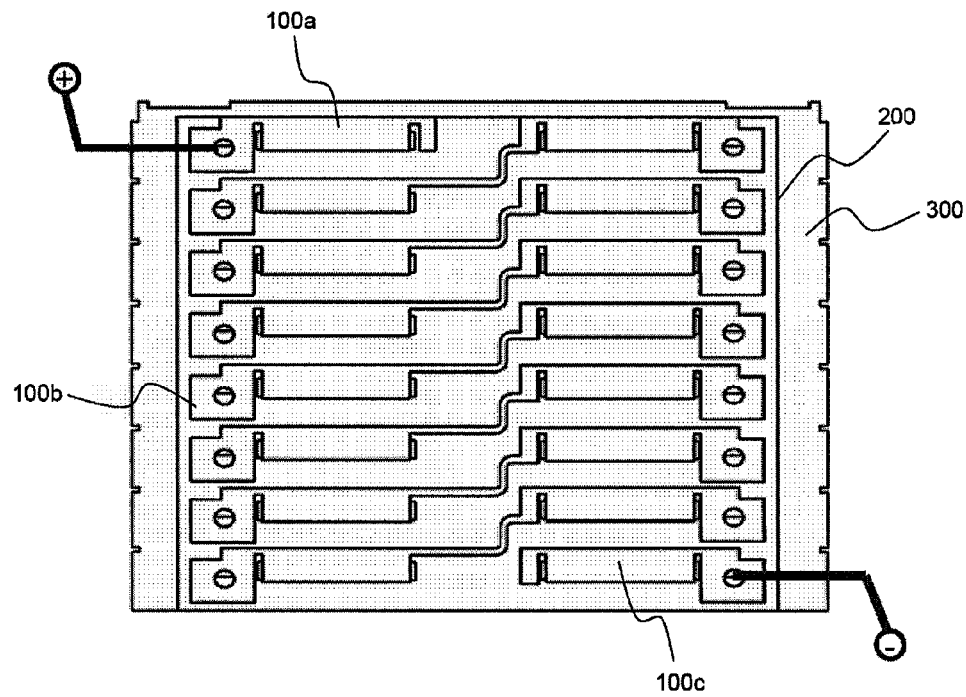
FIG. 18 is a typical view illustrating the structure of a middle- or large-sized battery module including battery cells connected in series with each other using the electrode terminal connecting members according to a preferred embodiment of the present invention.

FIG. 18 is a typical view illustrating the structure of a middle- or large-sized battery module including battery cells connected in series with each other using the electrode terminal connecting members according to a preferred embodiment of the present invention.

Referring to FIG. 18, the middle- or large-sized battery module 500 includes a total of eight battery cells, to each of which a mounting insulation member 200 is coupled while each battery cell is mounted in a cartridge module 300. Specifically, the middle or large-sized battery module 500 is constructed in a structure in which an A-type connecting member 100a is coupled to a cathode terminal located at the left upper end of the battery module 500, a C-type connecting member 100c is coupled to an anode terminal located at the right lower end of the battery module 500, and B-type connecting members 100b are coupled to the remaining electrode terminals, such that the eight battery cells are connected in series with each other (8S).

Figure 19:
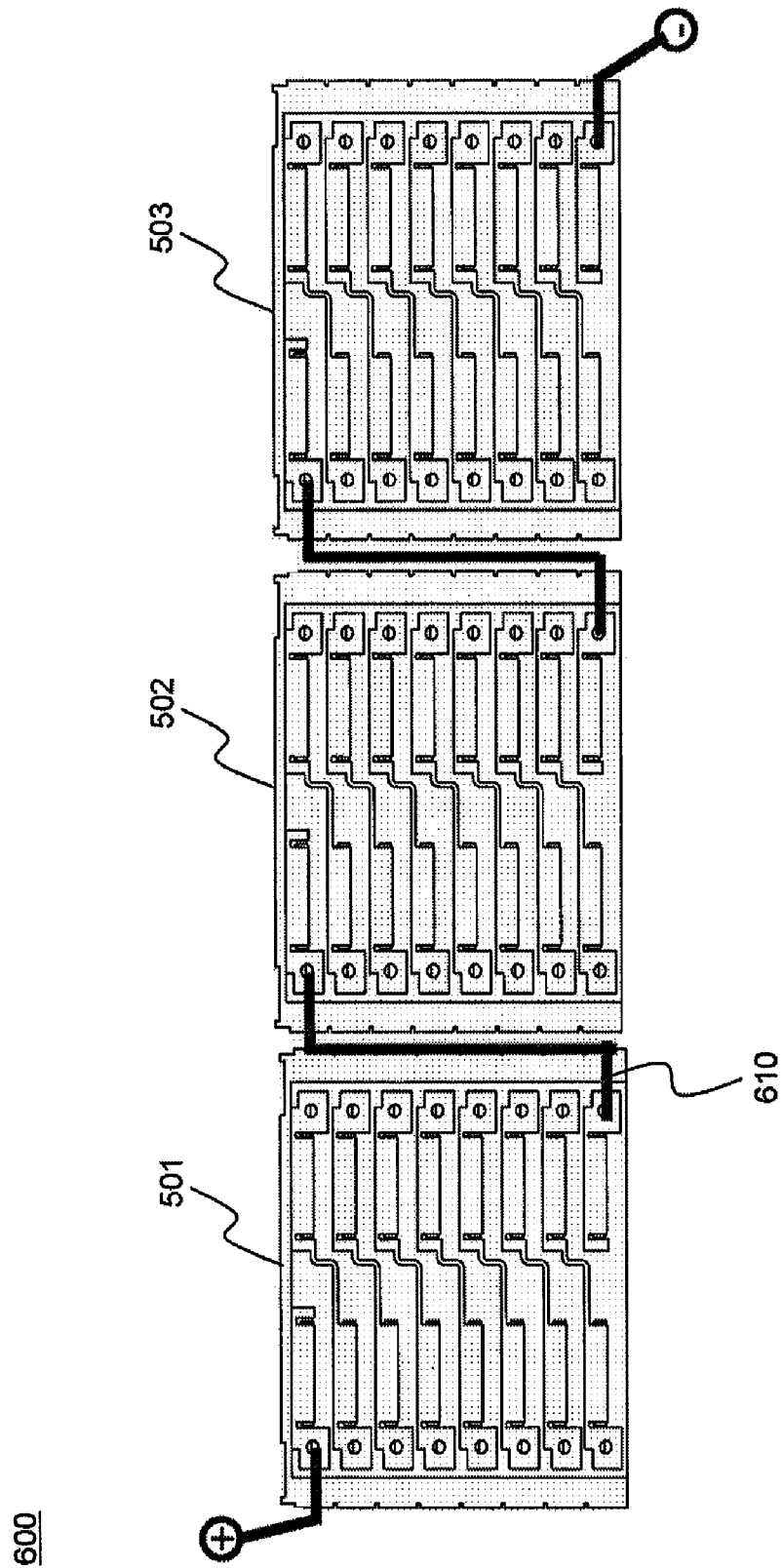
FIG. 19 is a typical view illustrating the structure of a large-sized battery module assembly according to a preferred embodiment, manufactured using the middle- or large-sized battery module of FIG. 18.

FIG. 19 is a typical view illustrating the structure of a large-sized battery module assembly according to a preferred embodiment, manufactured using the middle- or large-sized battery module of FIG. 18.

Referring to FIG. 19, the large-sized battery module assembly 600 is constructed in a structure in which a total of three middle- or large-sized battery modules 501, 502, and 503, one of which is shown in FIG. 18, are connected in series with each other via electrical connection members 610, such as electrical cables. Consequently, the large-sized battery module assembly 600 has an output voltage three times greater than that of one of the middle- or large-sized battery modules, i.e., the middle- or large-sized battery module 501.

Figure 20:
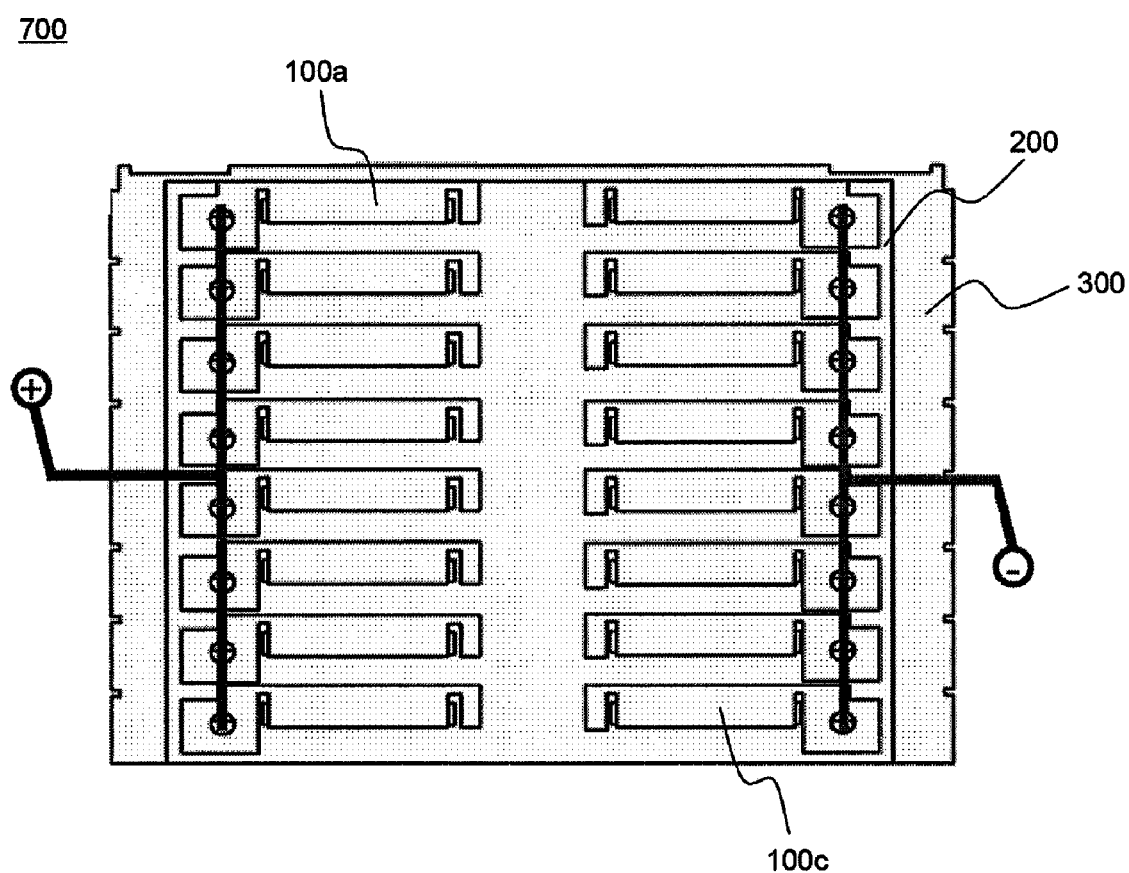
FIG. 20 is a typical view illustrating the structure of a middle- or large-sized battery module including battery cells connected in parallel with each other using the electrode terminal connecting members according to a preferred embodiment of the present invention.

FIG. 20 is a typical view illustrating the structure of a middle- or large-sized battery module including battery cells connected in parallel with each other using the electrode terminal connecting members according to a preferred embodiment of the present invention.

Referring to FIG. 20, the middle- or large-sized battery module 700 includes a total of eight battery cells, to each of which a mounting insulation member 200 is coupled while each battery cell is mounted in a cartridge module 300. Specifically, the middle- or large-sized battery module 700 is constructed in a structure in which A-type connecting members 100a are coupled to seven cathode terminals located at the left side of the battery module 700, C-type connecting members 100c are coupled to seven anode terminals located at the right side of the battery module 700, and the same electrode terminals are connected in parallel with each other via electrical connection members, such as electrical cables (8P).

Figure 21:
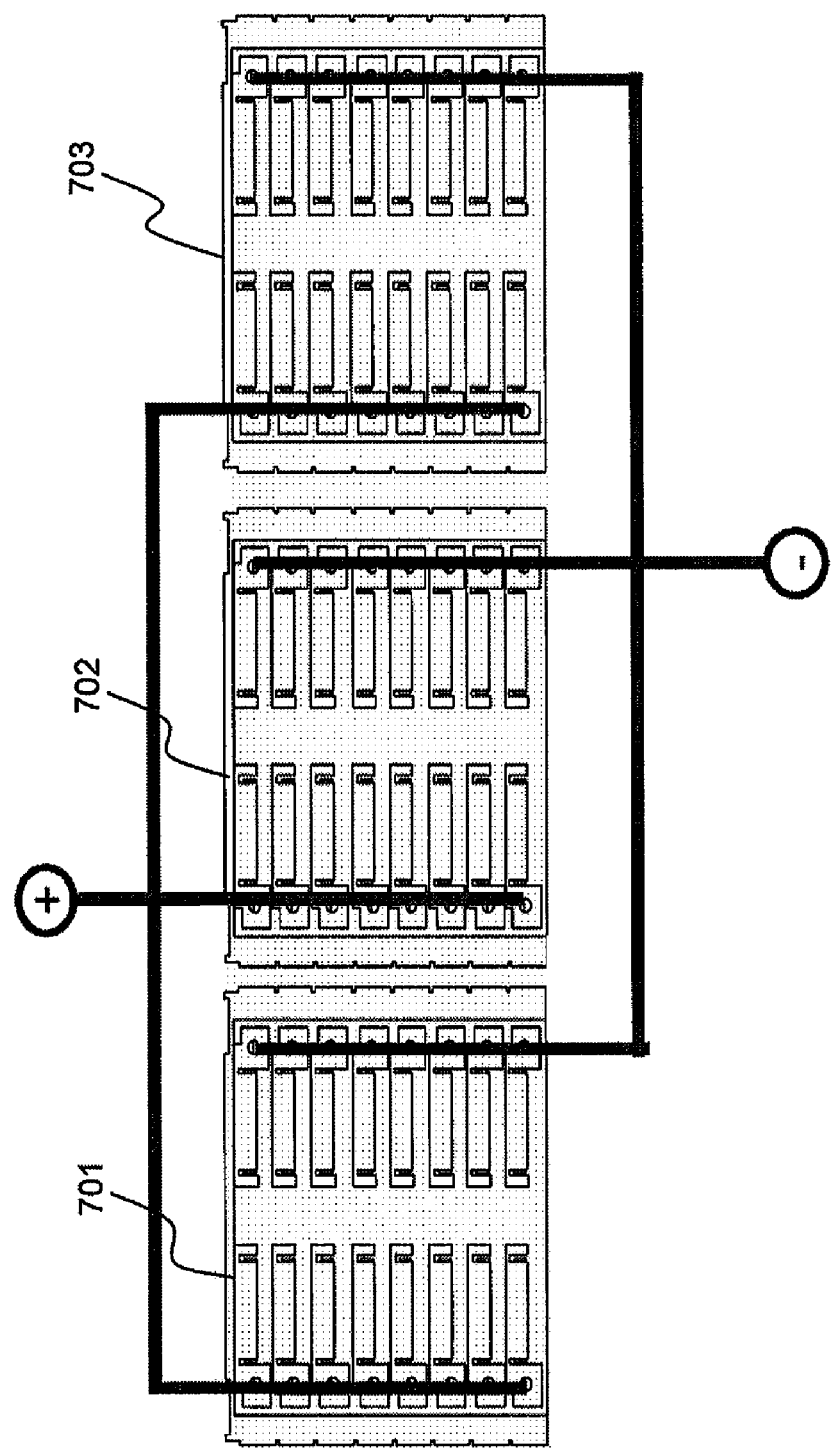
FIG. 21 is a typical view illustrating the structure of a large-sized battery module assembly according to a preferred embodiment, manufactured using the middle- or large-sized battery module of FIG. 20.

FIG. 21 is a typical view illustrating the structure of a large-sized battery module assembly according to a preferred embodiment, manufactured using the middle- or large-sized battery module of FIG. 20.

Referring to FIG. 21, the large-sized battery module assembly 800 is constructed in a structure in which a total of three middle- or large-sized battery modules 701, 702, and 703, one of which is shown in FIG. 21, are connected in parallel with each other to provide a large capacity (24P).

FIGS. 22 to 25 are typical views illustrating the structure of a middle- or large-sized battery module according to another preferred embodiment of the present invention and the structure of a battery module assembly manufactured using the middle- or large-sized battery module.

Figure 22:
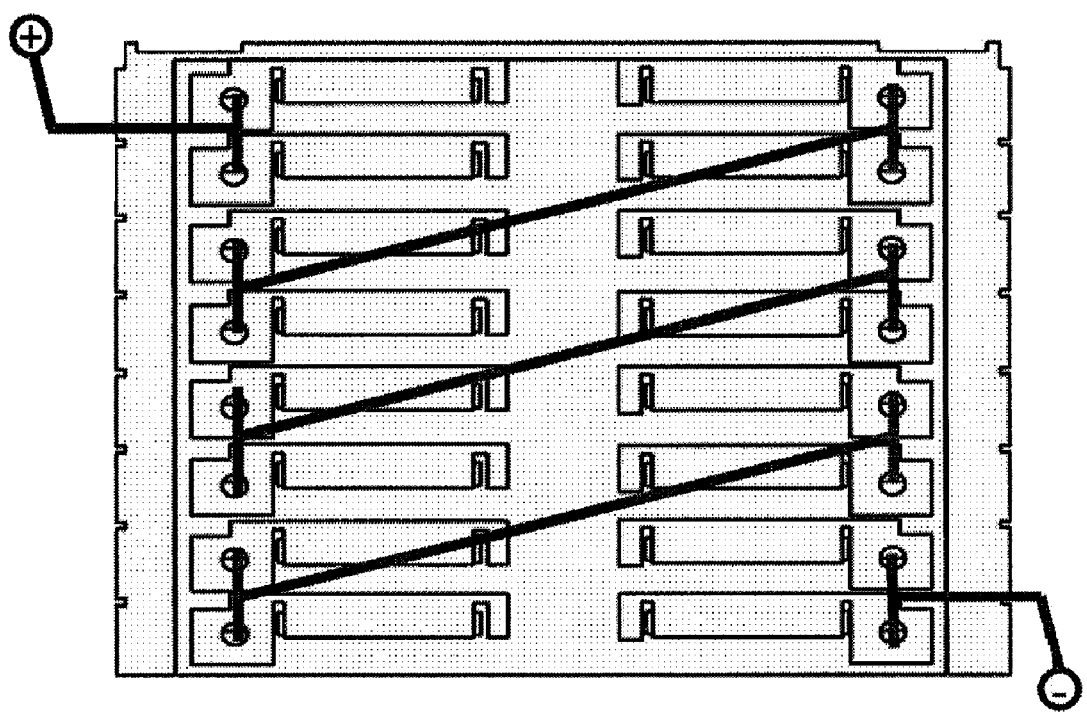
FIGS. 22 to 25 are typical views illustrating the structure of a middle- or large-sized battery module according to another preferred embodiment of the present invention and the structure of a battery module assembly manufactured using the middle- or large-sized battery module.

Referring first to FIG. 22, the battery module 900 is constructed in a structure in which every two battery cells are connected in parallel with each other via electrode terminal connecting members, and four battery cell groups, each having the two battery cells connected in parallel with each other, are connected in series with each other, i.e., a 4-serial and 2-parallel structure (4S2P).

Figure 23:
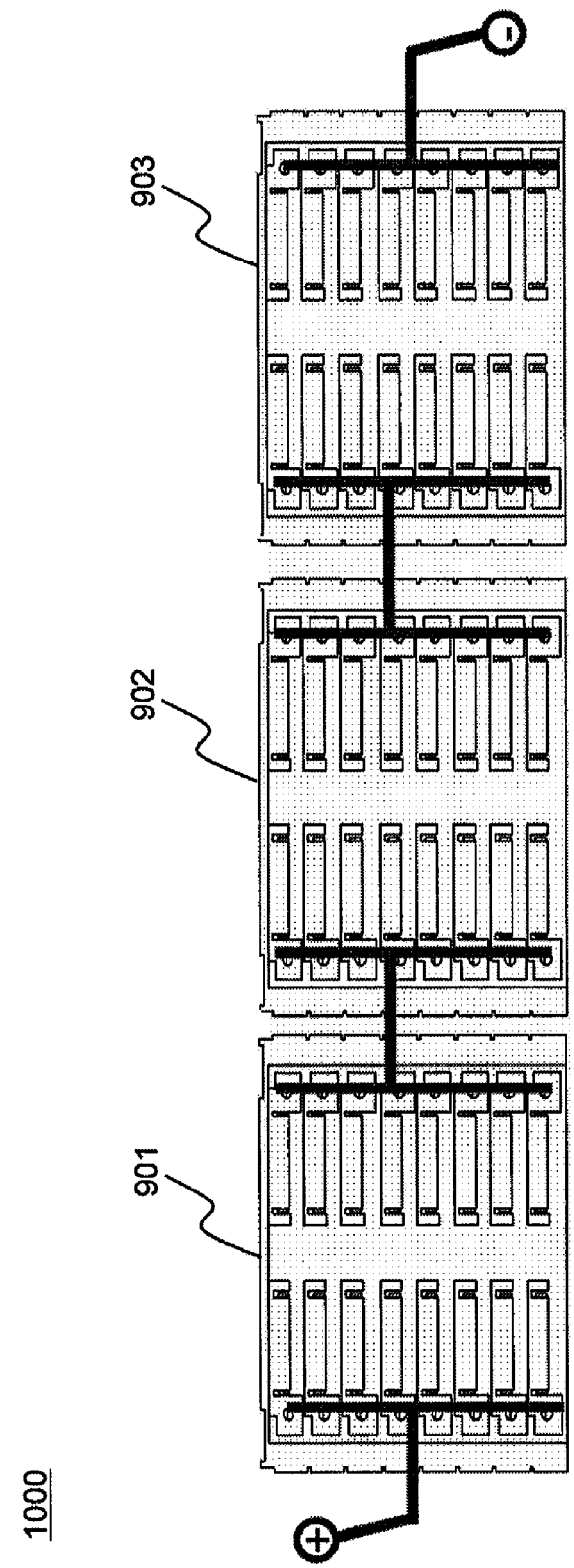

Referring to FIG. 23, the battery module assembly 1000 is constructed in a structure in which battery modules 701, 702, and 703 are connected in series with each other (3S), and battery cells of each battery module are connected in parallel with each other (8P).

Figure 24:
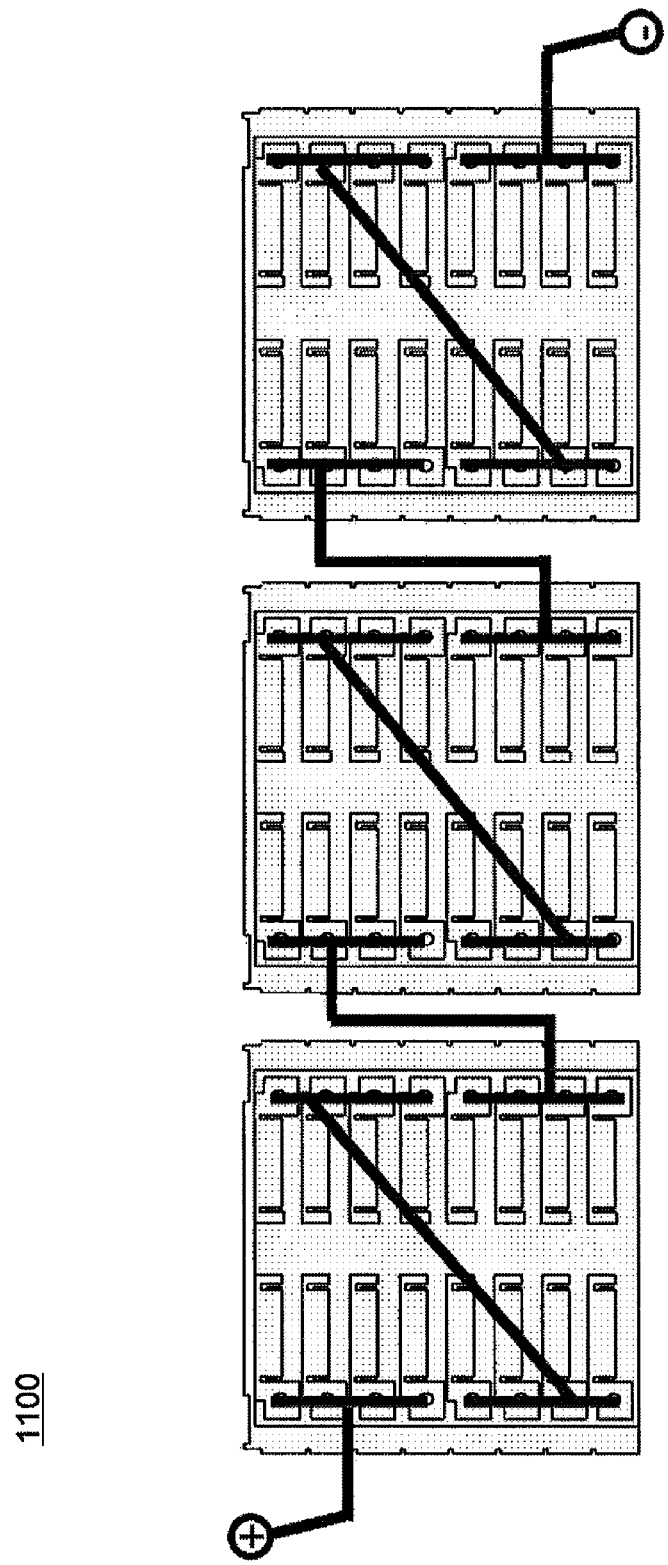

Referring to FIG. 24, the battery module assembly 1100 is constructed in a structure in which every four battery cells of each battery module are connected in parallel with each other via electrical connection members (4P), and battery modules are connected in series with each other (6S).

Figure 25:
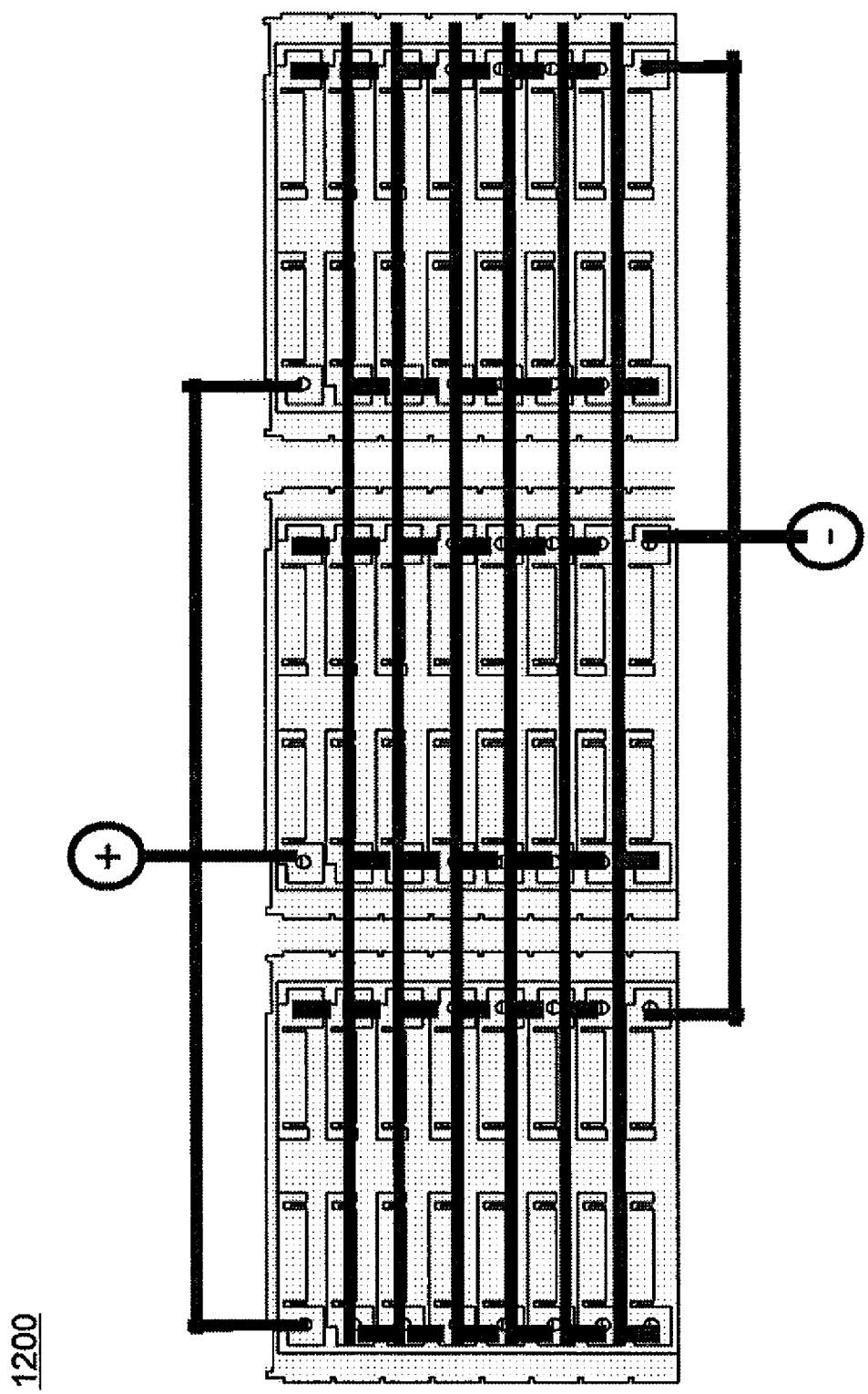

Referring to FIG. 25, the battery module assembly 1200 is constructed in a structure in which battery modules are connected in parallel with each other (3P), and battery cells of each battery module are connected in series with each other (8S).

Figure 26:
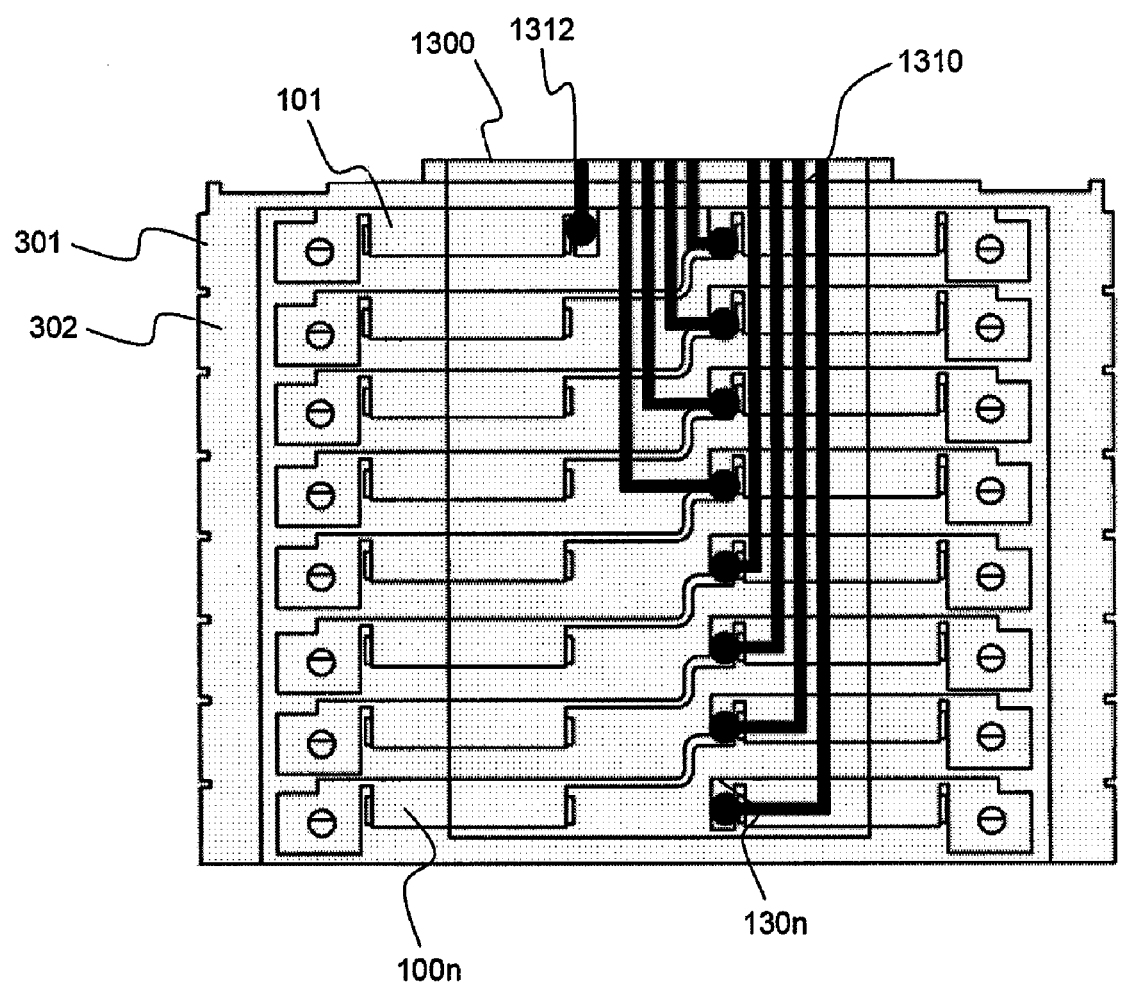
FIG. 26 is a typical view illustrating the connection of voltage detection terminals of electrode terminal connecting members in a middle- or large-sized battery module according to a further preferred embodiment of the present invention.

FIG. 26 is a typical view illustrating the connection of voltage detection terminals of electrode terminal connecting members in a middle- or large-sized battery module according to a further preferred embodiment of the present invention.

Referring to FIG. 26, a plurality of cartridge bodies 301, 302 . . . are stacked, and voltage detection terminals of electrode terminal connecting members, coupled to the fronts of the cartridge bodies 301, 302 . . . , protrude by a predetermined length.

Consequently, when a printed circuit board (PCB) 1300, having a plurality of connection circuits 1310 printed therein, is applied to the stacked cartridge bodies 301, 302 . . . , the voltage detection terminals 130$n$ of the electrode terminal connecting members 100$n$ are brought into contact with the PCB 1300, whereby the connection between the voltage detection terminals 130$n$ of the electrode terminal connecting members 100$n$ is accomplished at once.

One of the connection circuits 1310 of the PCB 1300, e.g., the connection circuit 1312, is connected to an electrode terminal connecting member 101 mounted in the first cartridge body 301, and, based on the voltage at this connection, the voltage of the respective battery cells is measured.

As described above, the battery cells or the battery modules, constituting the battery module assembly, are electrically connected in series and/or parallel with each other via the electrode terminal connecting members and the mounting insulation members according to the present invention based on desired output and capacity. Also, the battery cells or the battery modules are electrically connected to a control device for controlling all the battery modules and a field effect transistor (FET) device for controlling overcharge and overdischarge. In addition, various components are electrically connected to the battery modules via electrical connection members, such as bus bars, wires, or cables, for carrying out necessary operations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electrode terminal connecting member and the mounting insulation member for secondary battery modules according to the present invention are capable of stably connecting the electrode terminals of the battery cells by a simple assembly method and securely stacking the battery cells using mounting members, such as cartridges, thereby constituting a battery module.

Also, the battery cells are electrically connected in series and/or parallel with each other based on desired output and capacity, whereby the productivity and product quality are improved. Consequently, a middle- or large-sized battery module or a large-sized battery module assembly, assembled using the electrode terminal connecting member and the mounting insulation member according to the present invention, is preferably used as a power source for electric bicycles (E-bike), electric motorcycles, electric vehicles, or hybrid electric vehicles.

What is claimed is:

1. An electrode terminal connecting member for electrically interconnecting plate-shaped secondary battery cells ('battery cells') constituting a battery module, wherein the electrode terminal connecting member includes
   a monolithic structure comprising
      plural bent coupling parts, each bent coupling part bent to form a groove at a rear of the electrode terminal connecting member such that a plate-shaped electrode terminal of each battery cell is inserted into the groove,
an external input and output terminal protruding toward a front of the electrode terminal connecting member while being bent, and
a voltage detection terminal protruding toward the front of the electrode terminal connecting member while being bent,
wherein a number of the plural bent coupling parts and a number of the external input and output terminals corresponds to a number of the battery cells such that at least two battery cells are electrically connected to each other and wherein the external input and output terminal and the voltage detection terminal are bent in parallel to the front of the electrode terminal connecting member.

2. The electrode terminal connecting member according to claim 1, wherein the external input and output terminal is provided with a coupling hole.

3. The electrode terminal connecting member according to claim 1, wherein the plural bent coupling parts have different heights.

4. The electrode terminal connecting member according to claim 3, wherein the plural bent coupling parts include two bent coupling parts formed such that a height difference between the plural bent coupling parts is equivalent to a thickness of each battery cell, the external input and output terminals are located at opposite ends of the electrode terminal connecting member, and the voltage detection terminal is located approximately at a middle of the electrode terminal connecting member.

5. A battery module constructed in a structure in which electrode terminal connecting members according to claim 1 are coupled to corresponding electrode terminals of battery cells.

6. The battery module according to claim 5, wherein the battery module is formed by stacking a plurality of cell modules, each cell module having a battery cell mounted in a cartridge.

7. The battery module according to claim 6, wherein the cartridge includes
a cartridge body constructed in a rectangular structure corresponding to each battery cell such that the battery cell is mounted to the cartridge body, the cartridge body being open at a top thereof, and a top cover mounted to the top of the battery cell while the battery cell is mounted to the cartridge body, and wherein
the cartridge body is provided at a bottom thereof with a plurality of through-holes,
the cartridge body is provided at one side of an upper end of each side wall thereof with a coupling protrusion, by which the cartridge body is coupled to another cartridge body, while the cartridge body is provided at one side of a lower end of each side wall thereof with a coupling groove corresponding to the coupling protrusion, and
the cartridge body is provided at a front thereof with a coupling part, to which an additional member for mounting the electrode terminal connecting member is coupled in an assembly fashion, such that the electrode terminal connecting member is stably connected to the corresponding electrode terminal of the corresponding battery cell.

8. The battery module according to claim 7, wherein the battery cell is mounted to the cartridge body of each cell module, the cartridge bodies are stacked, and the top cover is coupled to the uppermost cartridge body.

9. A battery module assembly including a plurality of battery modules according to claim 7.

10. The battery module according to claim 7, wherein each battery cell is a pouch-shaped battery cell constructed in a structure in which an electrode assembly is mounted in a battery case made of a laminate sheet including a resin layer and a metal layer.

11. The battery module according to claim 10, wherein
the mounting insulation member is constructed approximately in a rectangular parallelepiped structure having a size approximately corresponding to the front of the cartridge body,
the mounting insulation member is provided at a rear thereof with a groove, in which the front end of each cartridge body is inserted,
the mounting insulation member is provided at a front thereof with a pair of holes, through which electrode terminals of each battery cell, introduced through the coupling groove, are exposed, and
the mounting insulation member is provided at a top thereof, above the electrode terminal through-holes, with a coupling upper end, which is inserted into the rear groove of the bent coupling part of the electrode terminal connecting member.

12. The battery module according to claim 11, wherein the mounting insulation member is provided at a front thereof with a location part, in which the external input and output terminal and the voltage detection terminal of the electrode terminal connecting member are stably located.

13. The battery module according to claim 12, wherein the mounting insulation member is provided at a location part thereof, in which the external input and output terminal of the electrode terminal connecting member is stably located, with a coupling depression.

14. The battery module according to claim 11, wherein the electrode terminals of each battery cell, exposed outward through the electrode terminal through-holes, are bent upward and brought into tight contact with the coupling upper end of the mounting insulation member to surround the coupling upper end of the mounting insulation member, and the coupling upper end of the mounting insulation member is inserted into the rear groove of the bent coupling part of the electrode terminal connecting member.

15. An electrode terminal connecting member for electrically interconnecting plate-shaped secondary battery cells ('battery cells') constituting a battery module, wherein the electrode terminal connecting member includes
plural bent coupling parts, each bent coupling part bent to form a groove at a rear of the electrode terminal connecting member such that a plate-shaped electrode terminal of each battery cell is inserted into the groove,
an external input and output terminal protruding toward a front of the electrode terminal connecting member while being bent, and
a voltage detection terminal protruding toward the front of the electrode terminal connecting member while being bent,
wherein a number of the plural bent coupling parts and a number of the external input and output terminals corresponds to a number of the battery cells such that at least two battery cells are electrically connected to each other, and
wherein the external input and output terminal and the voltage detection terminal are bent in parallel to the front of the electrode terminal connecting member.

* * * * *